United States Patent

[11] 3,579,185

[72] Inventor Wilhelm Spruth
Sindelfingen, Germany
[21] Appl. No. 761,186
[22] Filed Sept. 20, 1968
[45] Patented May 18, 1971
[73] Assignee International Business Machines Corporation
Armonk, N.Y.
[32] Priority Sept. 27, 1967
[33] Germany
[31] P 15 49 484.5

[54] METHOD AND APPARATUS FOR CHECKING A DATA TRANSFER OPERATION
12 Claims, 8 Drawing Figs.

[52] U.S. Cl. 340/146.1
[51] Int. Cl. H04l 1/10
[50] Field of Search 340/146.1; 235/153, 61.7

[56] References Cited
UNITED STATES PATENTS
3,384,902 5/1968 Schroder et al. 340/146.1
2,857,100 10/1958 Franck et al. 235/153
3,340,507 9/1967 Hotz 340/146.1

*Primary Examiner*—Malcolm A. Morrison
*Assistant Examiner*—R. Stephen Dildine, Jr.
*Attorneys*—Hanifin and Jancin and Carl W. Laumann, Jr.

ABSTRACT: The accuracy of a data transfer operation, particularly one which involves loading a micro program into an alterable control storage device for use in a data processing system, is verified by deriving a check number from the transferred data and comparing the desired check number with a predetermined check number known to be correct. A variety of concepts may be used to obtain the derived check number such as successive logical Exclusive OR operations on transferred blocks of data or selected portions of the blocks.

INVENTOR
WILHELM SPRUTH

BY [signature]
ATTORNEY

METHOD AND APPARATUS FOR CHECKING A DATA TRANSFER OPERATION

FIELD OF THE INVENTION

This invention relates generally to data processing systems and particularly to micro programmed systems having alterable control storage. The invention provides for checking a micro program loaded into control storage for both accuracy and identification.

DESCRIPTION OF THE PRIOR ART

To eliminate the need for reprogramming a data processing operation when a change is made from a given system to one of larger or smaller size, computer families have been provided. The machines in such a family use a uniform algorithm and similar instruction format. Despite the generally interchangeable nature of the programs written for machines in such a family, there are restraints imposed by the size of the storage unit, the number and type of input/output devices and economic considerations.

An additional problem arises where an alterable storage device is used for the retention of micro program information. In such systems the control (micro program) information may vary according to the task assigned to the machine. For example, a machine may be loaded with a control program to give it a basic personality. However, the same machine may be loaded with other control programs to allow the execution of programs written for other machines. In micro programmed machines having alterable control storage it is essential that the correct control program be properly loaded into the control storage area.

Another source of errors is the card deck used to enter the information into the machine. A single lost, mutilated or otherwise incorrect card can invalidate substantial portions of the control program rendering a subsequent machine run totally worthless.

Prior art systems for the transmission of data derive a check number from a data group to be transmitted in accordance with a certain concept and feed this check number, together with the data group, through the transfer channel to a receiver station. A check number is derived from the received data group which is then compared with the transmitted and received check number. A difference in the numbers serves to indicate an error.

It is therefore an object of the invention to provide an improved arrangement for checking the character and accuracy of transmitted data.

It is therefore an object of the invention to provide an improved method for transferring data having a predetermined information content.

It is another object of the invention to provide an improved means for transferring data having a predetermined information content.

Other objects of the invention include the provision of an improved method and apparatus for the entry of program information into a data processing system.

Still further objects of the invention include the provision of an improved method and apparatus for the entry of micro instructions into an alterable storage device for use in a data processing system.

SUMMARY OF THE INVENTION

The present invention provides a program checking arrangement utilizing the known principles of fault-precluding data transmission with a view to eliminating the disadvantages described. In accordance with the invention, this is achieved by connecting the program storage load channel of a data processing system to a check circuit for deriving a check number from the program to be loaded so that each instruction of the program contributes towards the check number according to a predetermined checking concept. After the last instruction has been loaded, the check number is representative of the loaded program. The key numbers of the programs to be checked, previously derived according to the same concept, are contained in a storage device of the machine. When the loading of the program has been completed, the derived check number and the key numbers stored in the machine are transferred to a comparator which generates a signal if the derived check number does not correspond to one of the stored key numbers.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
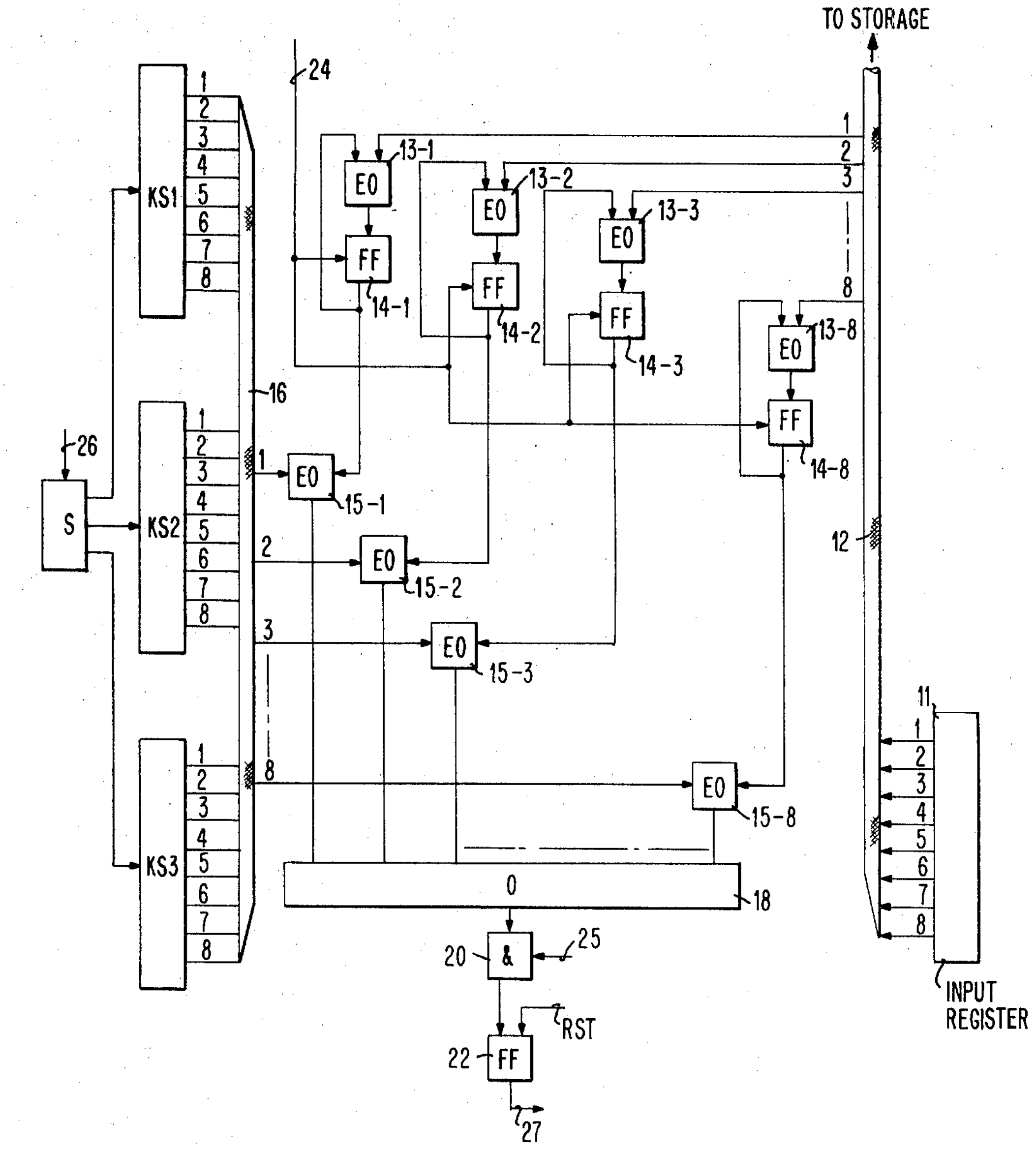
FIG. 1 is a block diagram of a program checking system in which all bit positions of each program instruction contribute to the formation of the check number.

The arrangement of FIG. 1 comprises an input register 11 and a bus 12 which is connected to an alterable storage device associated with the data processing system using the checking arrangement of the invention. The input register 11 serves to accommodate a group of data bits such as could be read from a single unit record card. This group could be a program instruction. In the embodiment shown each group contains eight bits. Bus 12 allows all eight bits to be transferred in parallel to the storage unit of the machine. After one bit group has been transmitted to storage, input register 11 is loaded with the next group from a card reader. In this manner, a program recorded in a card check is loaded into the storage of the machine. In the illustrative embodiment, the program to be checked is a micro program which is entered into a certain part of the storage. This program, representing a plurality of micro instructions, is also called a control program. The portion of storage occupied by this program is called control storage. Each exclusive OR circuit 13–1 to 13–1 is connected to one bit line of the bus 12. For simplicity's sake, some of these circuits are omitted in FIG. 1. The output of each of the exclusive OR circuits, hereafter referred to as EO-circuits, is connected to one of bistable circuits 14–1 to 14–8 which are operated as a binary counter and/or modulo-2-accumulator. The output of each of these bistable circuits, which provides a signal when the bistable circuit is set on, is fed back to the second input of the respective EO-circuits 13–1 to 13–8. In addition, each output is connected to one of input of EO-circuits 15–1 to 15–8. The other inputs to EO-circuits 15–1 to 15–8 are each connected to bus 16.

A key number, having a number of bit positions equal to the number of positions in the program instructions to be transmitted through the bus 12, is fed into the bus 16 from key number storage circuit KS1, KS2 or KS3. Each of these key number storage circuits KS1, KS2, or KS3 contains a key number which identifies a micro program to be stored. The key number can be stored by means of a hardware storage such as a transformer read only storage representing the respective bit configuration. A selector switch S serves to condition the storage circuits KS1, KS2 or KS3 to transfer the selected key number to the bus 16.

Output signals from the EO-circuits 15–1 to 15–8 are transmitted through an OR circuit 18 to an AND circuit 20 the output of which is connected to the set-on input of the bistable circuit 22. The other input to AND circuit 20 is conditioned by a signal on line 25 which indicates that the last data group has been transferred into storage.

For the purpose of description it shall be assumed that a micro program required for the proposed application must be loaded into storage prior to operating the data processing system. To this end the instructions of this program are fed consecutively into storage through the input register 11 and the bus 12. Prior to this transfer operation, a signal on line RST causes the bistable circuit 22 to be set off, the bistable circuits 14–1 to 14–8 being set to a defined initial state through resetting lines not shown. With each succeeding transfer operation from register 11 to the storage unit of the data processor over bus 12, a timing signal occurs on line 24 serving as a conditioning pulse for the inputs of the bistable circuits 14–1 to 14–8. The inputs of these bistable circuits are thus caused to respond to output signals of the EO-circuits 13–1 to 13–8. As the outputs of the bistable circuits 14 at this time indicate the binary value zero, output signals occur only in those of the EO-circuits 13 from which the associated bit line in the bus 12 carries the binary value 1. These output signals cause the corresponding bistable circuits 14–1 to 14–8 and the signal condition indicated by the output of the associated EO-circuits to be changed. If, for example, the bistable circuit 14–3 was initially in the zero-state and a one-bit occurred on the bit line 3 of the bus 12 during the first instruction transfer operation, this caused the bistable circuit to be changed to the one-state. If during the succeeding instruction transfer operation another one-bit occurs on the same bit line, no change signal from the EO-circuit 13–3 is applied to the bistable circuit 14–3 so that the latter remains in the one-state. Only if during one of the succeeding transfers a zero-bit occurs on bit line 3, is a change signal applied to the bistable circuit 14–3 causing the latter to be reset to the zero-state. In this manner, during program loading, a longitudinal parity check for each instruction bit position is carried out over the full length of the program (sum of all program instructions). The bit combination contained in the bistable circuits 14–1 to 14–8 at the end of the load operation, indicating longitudinal parity for all bit positions, is used as the program check number.

When the last program instruction is loaded, a signal on line 25 occurs, preparing the AND circuit 20 for signal transmission from the OR circuit 18 to the bistable circuit 22. This signal can, for example, be produced by the card read unit in a well known manner to indicate that all program cards have been read. At this time the comparator EO-curcuits 15–1 to 15–8 receive the longitudinal parity bit combination from the bistable circuits 14–1 to 14–8 at one set of inputs and a selected program key number from the storage circuits KS1 to KS3 at the other set of inputs. The EO-circuits provide an output signal only when the signals at the two inputs are different.

Assume that signals on line 26 cause the selector switch S to be set in a manner so that the contents of the storage circuit KS3 are connected through the the bus 16 reaching the EO-circuits 15. Moreover, it shall be assumed that the contents of this storage circuit KS3 contain the correct key number for the program previously loaded. When the program is initially prepared, this key number is derived in a known manner in the form of a longitudinal parity of the program through modulo-2-accumulation of the bit positions of the instructions over the full length of the program. If this key number corresponds to the bit combination of the derived check number contained in the bistable circuits 14–1 to 14–8 after completion of the load operation, none of the EO-circuits 15–1 to 15–8 emits an output signal so that the bistable circuit 22 remains in the OFF state. Where the key number does not correspond to the bit combination, one or several of the EO-circuit 15 emit an output signal which, through the OR circuit 18 and the conditioned AND circuit 20, sets the bistable circuit 22 to the ON state in which it causes an alarm indicator line 27 to emit a signal. A signal on this line may indicate to the operator that the micro program loaded is either not the micro program belonging to the machine concerned or is incomplete. The signal from line 27 may also serve as a machine stop signal.

Where several micro programs are provided for one machine, the correct key number for each of the micro programs is stored in one of the storage circuits KS. In this case the check must extend to all key numbers stored. To this end the operator may manually advance the selector switch S, designed as a rotary switch, to the next key number after an alarm signal on line 27. This process is continued until a key number is found which does not result in an alarm signal being emitted, indicating a check number constituting a complete micro program belonging to the machine. Where an alarm signal is emitted for all key numbers contained in the circuits KS, the program loaded is either a program not belonging to the machine concerned, an incomplete one or one containing an error. The individual key numbers may alternatively be set automatically by equipping the selector switch S, for example, with a known step switch arrangement which starts operating upon the emission of a signal on line 27 and continues advancing until the signal on this line disappears.

Figure 2:
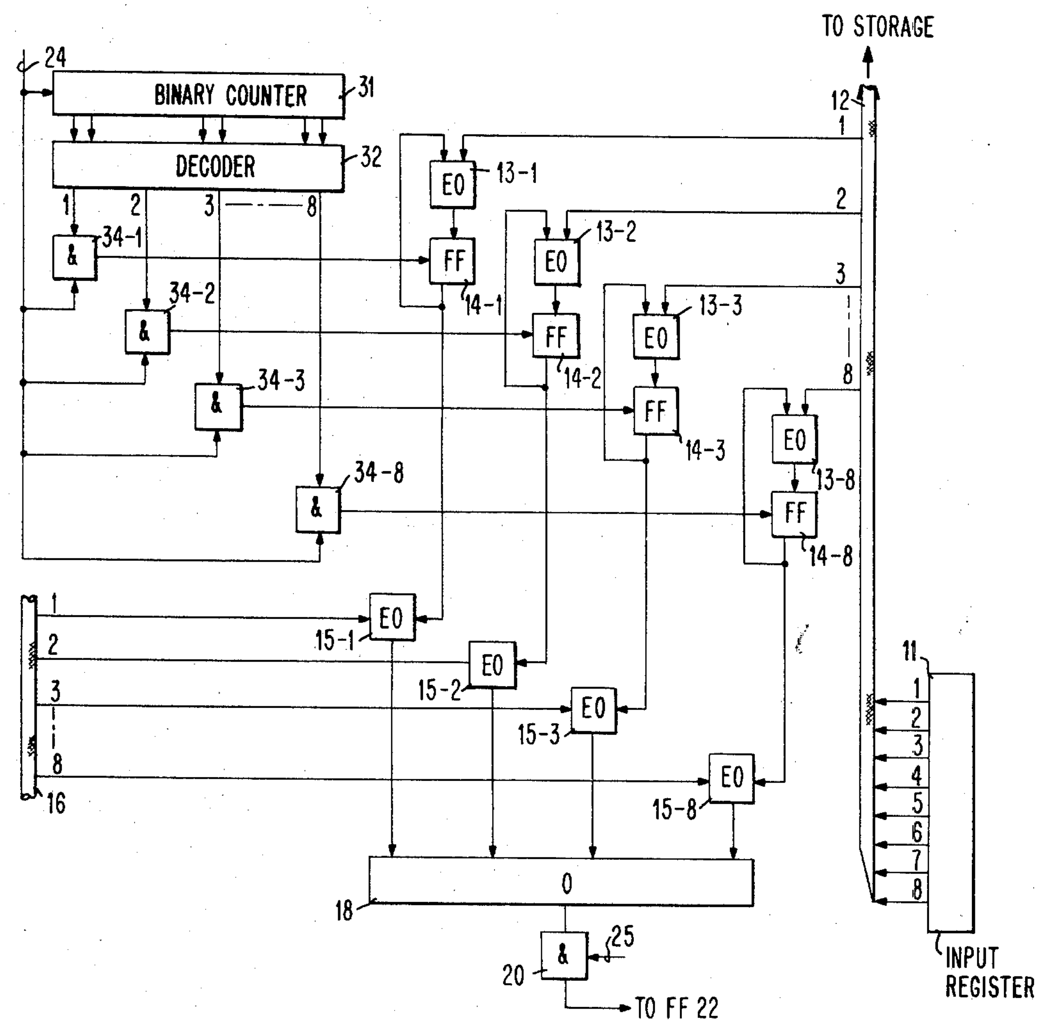
FIG. 2 is a block diagram of another embodiment of a program checking system in which only one bit position of each program instruction contributes to the formation of the check number.
Figure 3A:
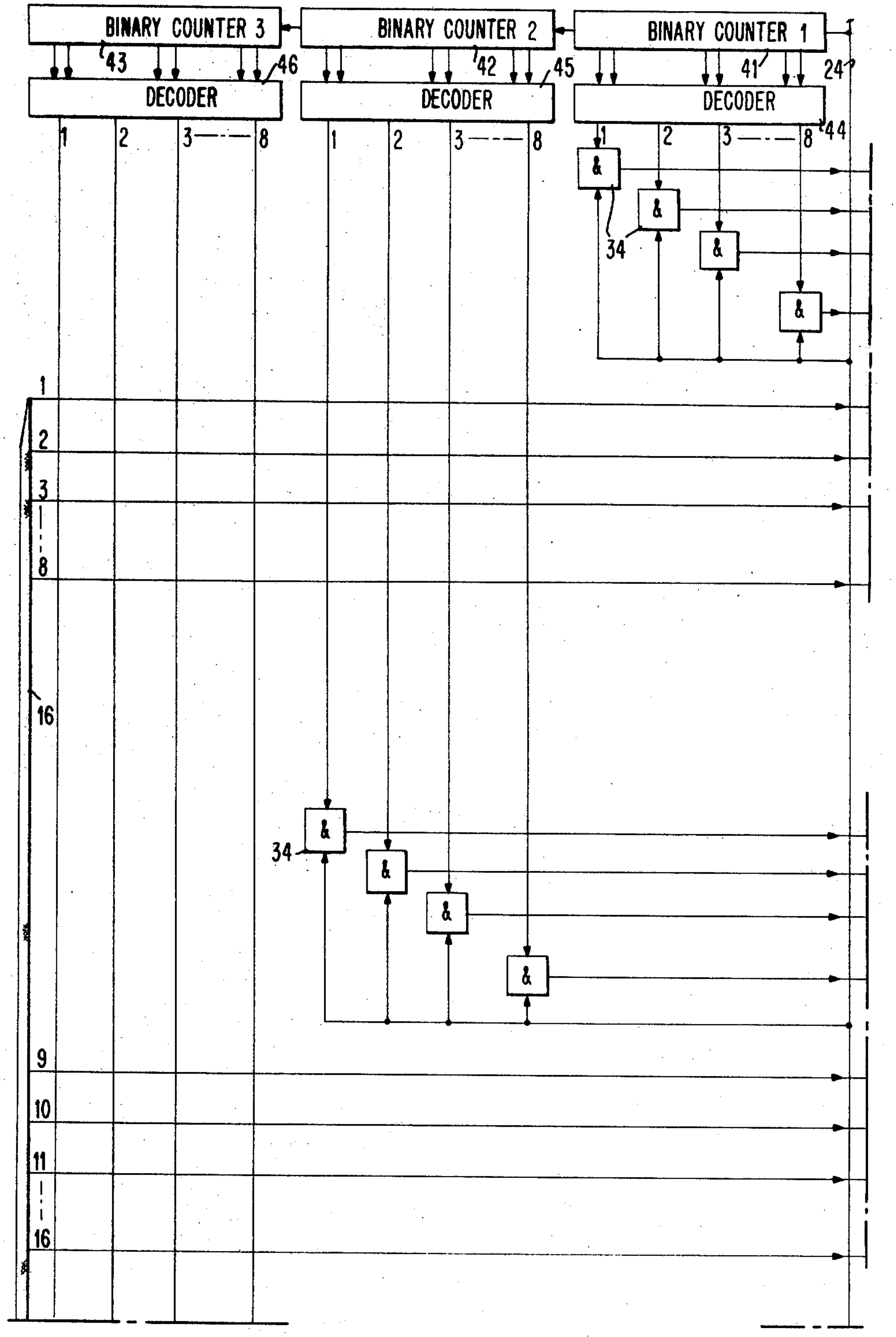
FIGS. 3A—3D are a composite block diagram of a further embodiment in which a changing selection of bit positions of the program instructions is used for deriving the check number.
Figure 3B:
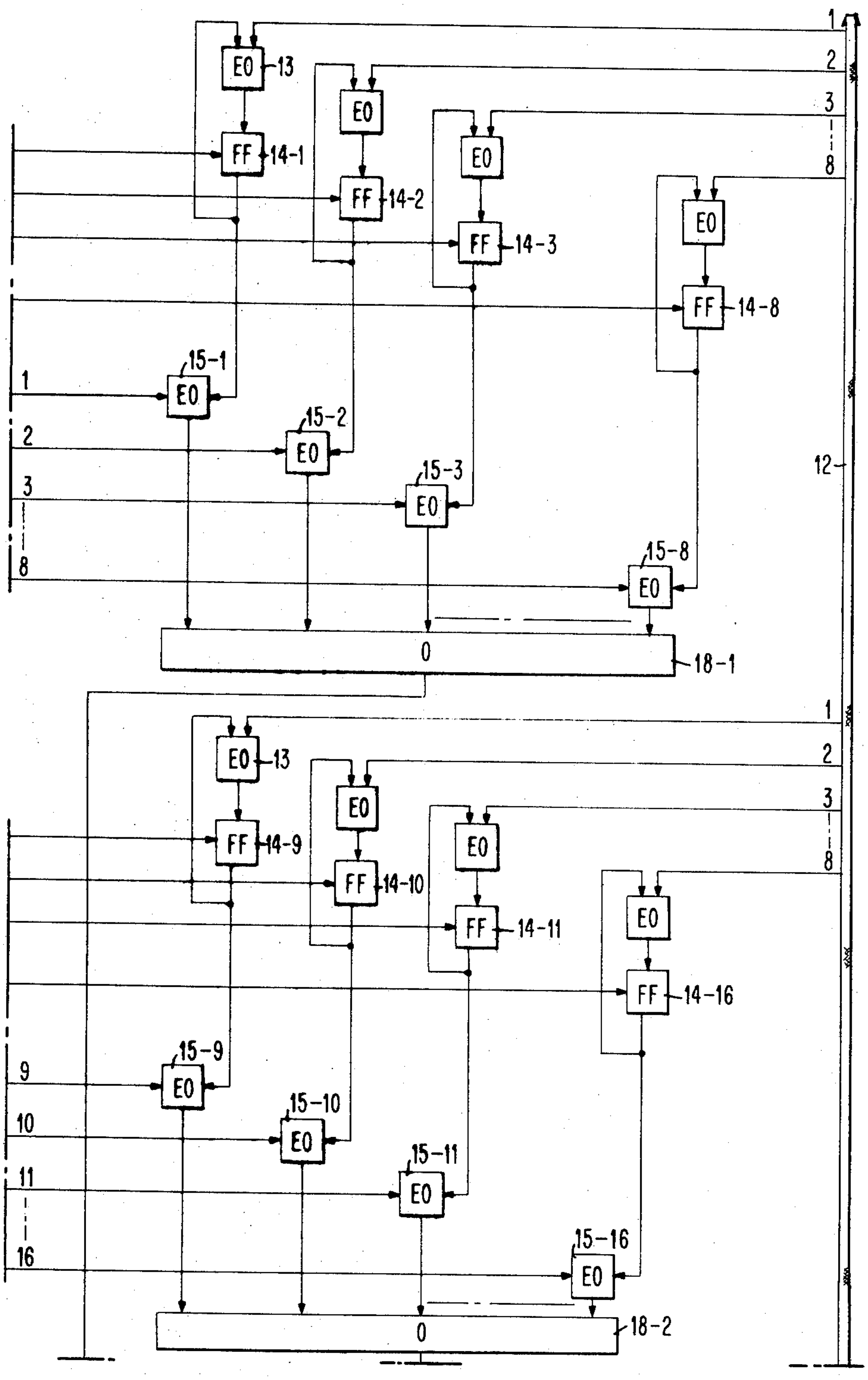
Figures 3C, 4:
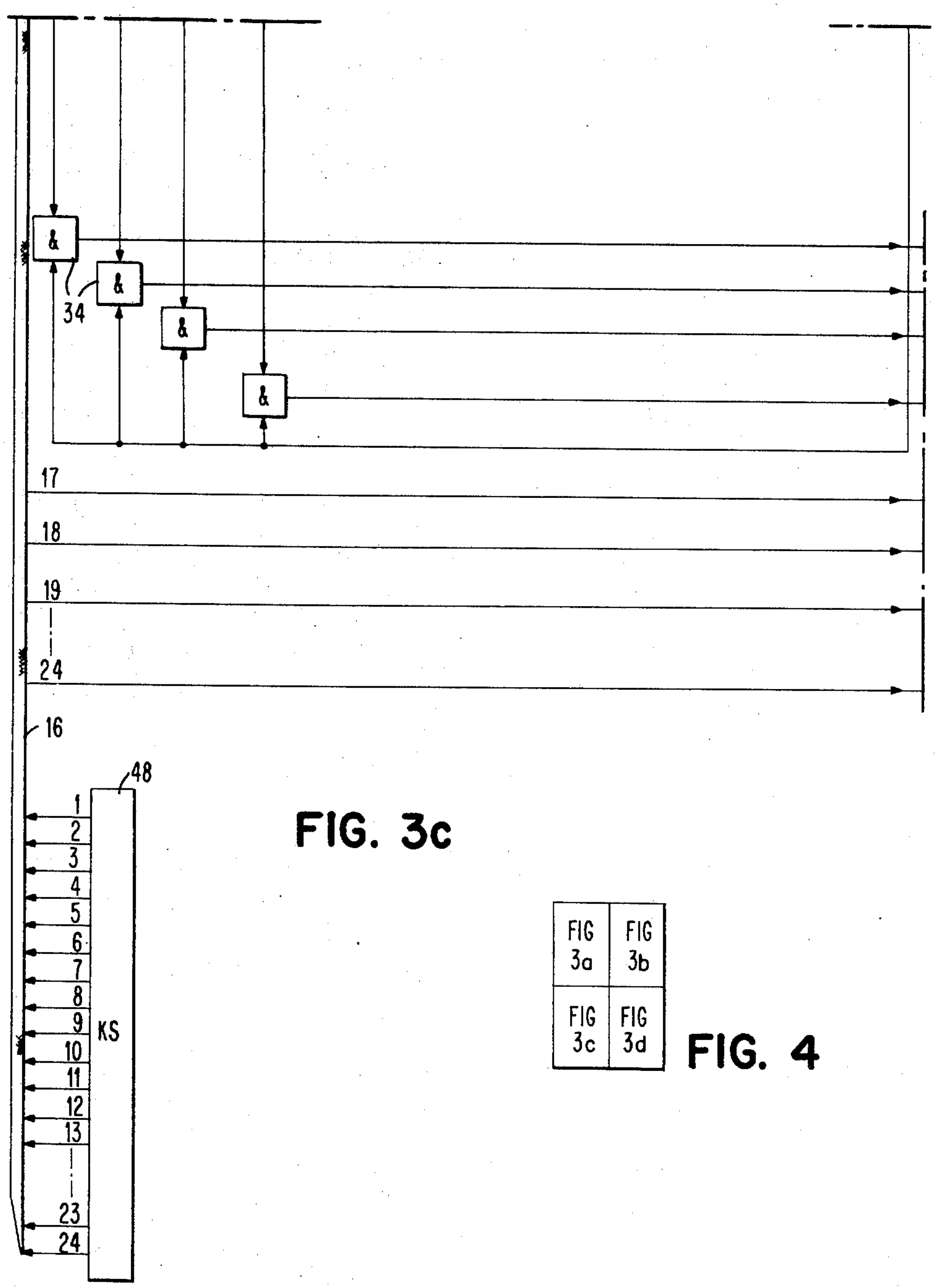
FIG. 4 shows the interrelation of FIGS. 3A to 3D.
Figure 3D:
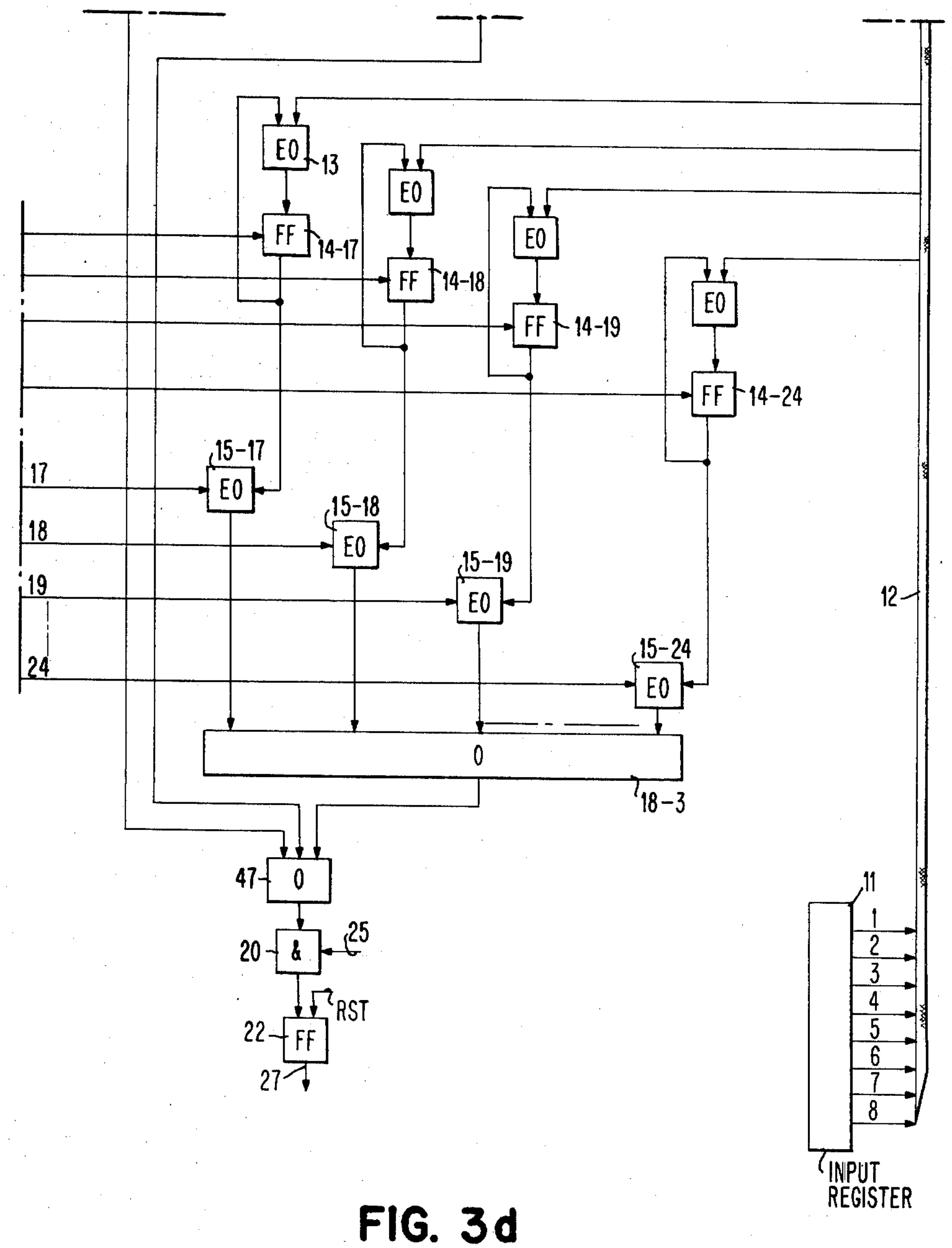

FIG. 2 shows another embodiment of the invention. This arrangement differs from the one previously described in that only selected bits of each instruction of the program contribute towards the formation of the check number. When using the longitudinal parity as a check number there is the danger of the micro program being extended by the erroneous addition of instruction cards to the micro program deck, resulting in a longitudinal parity which accidentally corresponds to the key number associated with the program. This risk is reduced in the arrangement of FIG. 2 where only one bit position of each instruction in sequence contributes towards the formation of the check number.

The arrangements of FIGS. 2 and 1 are basically of the same design. Identical components are provided with the same reference numbers. The arrangement of FIG. 2 additionally comprises a binary counter 31 and a decoder 32 connected to the latter. The binary counter 31 has eight counting positions. The timing pulse occurring on line 24 during the transmission of each instruction to core storage advances the counter by one position. In accordance with its value it feeds an output signal combination to the decoder 32, where conversion is effected in a known manner into a one-out-of-eight code. The output signals of the decoder 32 are transferred to the AND circuits 34–1 to 34–8 having, as a second input signal, the transfer control signals on line 24.

The operation of the arrangement is as follows: The instructions of the program to be loaded are divided into groups of eight, this being effected by means of the counter 31 which is advanced by one by each instruction and which after eight counting steps restarts counting in the one-position. In accordance with the state of counter 31, one of the AND circuits 34–1 to 34–8 is conditioned, through the decoder 32, for passing the next transfer timing signal from line 24 to one of the associated bistable circuits 14–1 to 14–8.

The association between the state of counter 31 (output signals 1 to 8 of the decoder 32) and the bit positions of the instructions associated with the bistable circuits 14–1 to 14–8 is such that the numbering of the counting positions corresponds to that of the bit positions. Thus state 1 corresponds to bit position 1, state 2 to bit position 2, etc. Consequently, a timing pulse on line 24 indicating the transmission of an instruction to storage becomes effective as a conditioning pulse in only one bistable circuit 14, changing the contents of the latter only if they differ from the binary value of the associated bit position in an instruction just transmitted. The contents of the remaining bistable circuits 14 remain unchanged, since no conditioning pulses are applied to these circuits from the AND circuits 34. Therefore, a longitudinal parity is determined for each bit position to which every eighth instruction contributes in sequence. At the end of the load operation (transfer of the last instruction) the contents of the bistable circuit 14 constitute a check number derived in the manner described in the form of a selective cyclic longitudinal parity of the bit positions of the instructions. This check number, as previously described, is compared with a key number stored in the machine and derived for the program concerned in accordance with the same concept. The key number is stored in the machine is applied through a bus 16 to the EO-circuits 15 performing the comparison. For simplicity's sake the circuitry for storing and selecting the key number is not shown in FIG. 2. The circuitry may be similar to that shown and explained in FIG. 1.

A further arrangement is shown in FIGS. 3A to 3D. In these FIGS. the parts already described in conjunction with FIGS. 1 and 2 use the same reference numbers. Instead of one binary counter 31 as used in the arrangement of FIG. 2, the arrangement of FIGS. 3A to 3D comprises three such counters 41, 42 and 43 (FIG. 3A) each having a counting capacity of eight. These counters are connected in the form of a ring, and the counter values when combined define a counting cycle with 512 counting positions. Each of these counters is associated with a one-out-of-eight decoder 44, 45, 46. The outputs 1 to 8 of each of these decoders through the AND circuits 34, serve to condition the bistable circuits 14–1 to 14–8 14–9 to 14–14 and 14–17 to 14–24 (FIG. 3B, D) operated as modulo-2-accumulators. Each of these bistable circuit groups is connected to the bus 12 and on the output side to appropriate EO-circuits 15 as described in conjunction with FIG. 2.

A storage circuit 48 contains a program key number with 24 bit positions. These bit positions are divided into three groups. The bit positions 1 to 8 are fed to the EO-circuits 15–1 to 15–8 of the first group of bistable circuits 14–1 to 14–8 which are controlled by the counter 31 through the decoder 44. The bit positions 9 to 16 are applied to the EO-circuits 15–9 to 15–16 of the second group of bistable circuits 14–9 to 14–16 which are controlled by the counter 42 through the decoder 45, and the bit positions 17 to 24 are transferred to the EO-circuits 15–17 to 15–24 of the third group of bistable circuits 14–17 to 14–24 which are controlled by the counter 43 through the decoder 46. The outputs of the EO-circuits 15–1 to 15–8 and of the EO-circuits 15–9 to 15–16 of 15–17 to 15–24 are respectively linked by means of a first OR circuit 18–1 and the OR circuits 18–2 and 18–3. The outputs of the latter OR circuits are connected to the AND circuit 20 through a further OR circuit 47.

Figure 5:
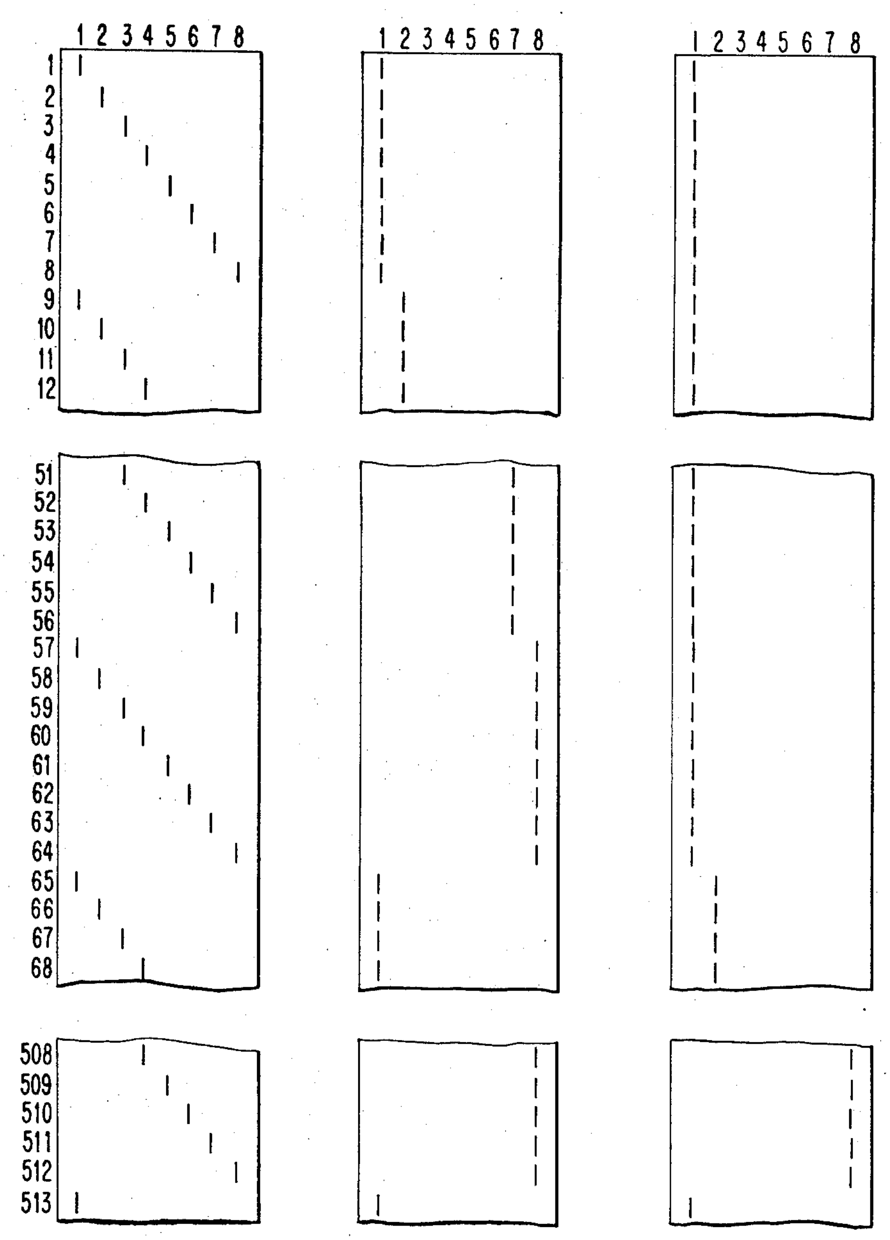
FIG. 5 is a pulse diagram explaining the operation of the arrangement of FIGS. 3A to 3D.

The operation of the arrangement can be seen from the pulse diagram of FIG. 5. The left margin of this diagram indicates the serial number of the instructions entered. In addition, there are three columns for the three groups of bistable circuits 14–1 to 14–8, 14–9 to 14–16 and 14–17 to 14–24, controlled by the counters 41, 42, 43, with the values of their bit positions. The bistable circuit which receives a conditioning pulse during the transmission of an instruction through the associated AND circuit 34 is marked with a vertical line. Thus in the first of eight instructions a different bit position is selected in the first group to contribute to the information of the check number through longitudinal parity accumulation. In the second group the same bit position of eight successive instructions contributes towards the formation of the check number prior to the next bit position being conditioned. This cycle multiplies itself by the factor 8 in the third group so that of 64 successive instructions the identical bit positions together with the conditioned bit positions of the remaining groups contribute towards the formation of the check number.

This results in a total cycle of 512 instructions in which the same combination of conditioning pulses does not repeat itself. Only with the 513th instruction does the same cycle commence anew. In this manner at the end of the program a 24-bit position check number in the form of a selectively and cyclically overlapping parity of the various bit positions of the instructions is contained in the bistable circuits 14–1 to 14–24. This check number is compared with the key number contained in the storage circuit 47 and derived in accordance with the same concept. If at the end of the program load operation (signal on line 25), one of the EO-circuits 15 emits a "not in accordance" signal, this signal is applied to the bistable circuit 22 through the associated OR circuit 18–1, 18–2 or 18–3, the OR circuit 47 and the AND circuit 20, causing the bistable circuit to be set ON to emit an alarm signal on line 27.

The concept used in the arrangement of FIGS. 3A to 3D can be extended to comprise a greater cycle by adding further three-position binary counters. The use of four three-position binary counters, for example, in conjunction with four groups of modulo-2-accumulators results in a total cycle of 4,096 instructions.

Deviating from the concept as represented, another suitable algorithm can be used for deriving the check number. To this end one bit each of each instruction or a combination of several bits of each instruction can contribute towards the formation of the check number. The latter method is expedient in all those cases where the instructions comprise a greater number of bit positions than the embodiments described.

While specific hardware has been shown for the practice of the invention, it will be appreciated that the method applies equally well to a sequence of micro instructions. This is an advantageous arrangement where the invention is used to check the validity and accuracy of a micro program loaded into control storage. In such situations the various registers, gates and logic circuits within the machine operate under the control of a micro program routine to perform the method of the invention. Such a micro program routine could be entered into storage prior to loading the control program to handle the subsequent loading of the loading of the control program.

In the alternative, the micro routine could be included in the control program. In that case the validity and accuracy check is made subsequent to the initial entry by scanning the control storage area.

While the invention has been particularly shown and described with reference to preferred embodiments thereof, it will be understood by those skilled in the art that the foregoing and other changes in form and detail may be made therein without departing from the spirit and scope of the invention.

I claim:

1. Means for checking the transfer of a plurality of data blocks in which the data has a desired information content comprising,
   means for deriving a check number from said transferred data according to a predetermined checking concept,
      said checking concept operating so that each data block contributes to the check number,
   means for storing a key number prior to the transfer operation to be checked,
   comparison means,
      means for supplying said derived check number and said key number to said comparison means,
   said comparison means having an output signal means for indicating the result of comparing said derived check number and said key number.

2. A device according to claim 1 wherein the information in each data block is contained on a single record card.

3. Means for checking a data transfer operation in which the data is arranged in a plurality of groups and has a desired information content comprising,
   means for deriving a check number from said transferred data according to a predetermined checking concept,
      said checking concept operating so that every data group contributes to the check number,
   means for storing a key number prior to the transfer operation to be checked,
   comparison means,
      means for supplying said derived check number and said key number to said comparison means,
   said comparison means having an output signal means for indicating the result of comparing said derived check number and said key number.

4. A device according to claim 3 wherein the information in each group is contained on a single record card.

5. Means for checking a message transfer operation in which the message comprises a plurality of data words and has a predetermined information content, comprising, means for deriving a check number from said transferred data according to a predetermined checking concept, said checking concept operating so that the data in each word contributes to the check number, means for storing a key number prior to the transfer operation operation to be checked, comparison means, means connected to said means for deriving a check number and said means for storing for supplying said derived check number and said key number to said comparison means, said comparison means having an output signal means for indicating the result of comparing said derived check number and said key number.

6. Means for checking the accuracy of a data transfer operation comprising, a first register having a plurality of bit positions, means for entering transferred data into said first register, a plurality of logical Exclusive Or circuits each having first and second input terminals, and an output terminal, means connecting said first input to said first register to be energized by individual bit positions in said register, a plurality of storage means each having an input and an output terminal, means connecting said output terminal of said Exclusive Or circuit to said input terminal of said storage means, means connecting each said output terminal of said storage means to each said second input terminal respectively whereby data presented serially to said first register is sequentially Exclusive Or'd with the result of the preceding Exclusive Or operation, data storage means containing a key number representing the desired output of said Exclusive Or circuits at the conclusion of a data transfer operation, and means for comparing the final output signals from said Exclusive Or circuits with said key number.

7. A device according to claim 6 wherein said means for comparing comprises, comparator means having first and second input terminals, means respectively connecting said output terminals of said Exclusive Or circuits to said first input terminals at the conclusion of a data transfer operation, means for reading said key number from storage and applying it to said second input terminals, means responsive to the combined outputs of said comparator means for indicating the result of the comparison between said key number and the output signals from said Exclusive Or circuits.

8. The method of checking the validity of a data transfer operation comprising the steps of:

1. Transferring a quantity of data having a predetermined desired content and being divided into blocks,
2. Deriving a check number from said transferred data according to a concept where each data block contributes to said number,
3. Comparing said derived check number with a key number derived prior to the transfer operation to be checked and indicative of said desired content,
4. Generating a signal indicating the result of said comparison.

9. A method according to claim 8 wherein the step of deriving a check number proceeds according to a concept where a binary bit in a data block contributes to a bit in the derived check number independently of other bits in the data block.

10. The method of checking the validity of a control program loaded into an alterable storage device comprising the steps of:

1. Reading said control program into said storage device from on input device,
2. Deriving a check number from said control program where each instruction contributes to said check number,
3. Comparing said derived check number with a key number derived prior to the loading of said control program and known to represent the correct control program,
4. Generating a signal indicating the result of said comparison.

11. A method according to claim 10 wherein the step of deriving a check number proceeds according to a concept where a binary bit in an instruction contributes to a bit in the derived check number independently of other bits in the instruction.

12. A method according to claim 10 wherein the step of deriving a check number comprises successive logical Exclusive Or operations on said transferred instructions.